3,195,997
METHOD FOR ACCELERATING GERMINATION AND GROWTH OF PLANTS
Iwao Arai, Toyama-ken, Motoji Yamashita, Uozu-shi, Toyama-ken, and Satoru Yamashita, Setagaya-ku, Tokyo, Japan, assignors to Nippon Carbide Kogyo Kabushiki Kaisha, Tokyo, Japan, a corporation of Japan
No Drawing. Filed Aug. 1, 1962, Ser. No. 213,849
Claims priority, application Japan, June 12, 1962, 37/23,750
11 Claims. (Cl. 71—2.1)

This invention relates to a plant germination and growth regulator as well as a method of accelerating the growth of plants. More particularly, the invention relates to a method of accelerating the germination and growth of plants by using a plant germination and growth regulator having 1-chloro-1,2-dibromoethane as its effective ingredient.

Heretofore, as plant growth regulators there have been known numerous substances including the indole compounds such as 3-indoleacetic and 3-indolebutyric acids; the naphthalene compounds such as 1-naphthaleneacetic acid and its derivatives; 2-naphthoxyacetic acid and its higher homologs; the substituted aliphatic acid, esters, and salts such as 2-chlorophenoxyacetic acid, 4-chlorophenoxyacetic acid, 2,4-dichlorophenoxyacetic acid, 2,4,5-trichlorophenoxyacetic acid and their higher homologs; and the substituted benzoic acids such as 2,3,6-trichlorobenzoic acid, 2,3,5-triiodobenzoic acid, and 2,5-dichlorobenzoic acid.

The present invention concerns a plant germination and growth regulator which uses as its effective ingredient a substance that is of an entirely different class from that used heretofore.

It was known heretofore that the other halogenated chain hydrocarbons besides 1-chloro-1,2-dibromoethane, such as, for example, the mixture of 1,3-dichloropropene and 1,2-dichloropropane (D-D), ethylene dibromide (EDB), 1,2-dibromo-3-chloro-propane (DBCP), ethylene dichloride (EDC) and ethylene chlorobromide (ECB) had nematocidal effect. It was known however that when the foregoing halogenated chain hydrocarbons, which were used as fumigants, were made to contact the seed and plants over an extended period, rather than favorable effects, there was brought about adverse effects on the germination of seeds and the growth of plants.

We found, to our surprise, that 1-chloro-1,2-dibromoethane had properties which differed greatly from the other halogenated chain hydrocarbons known as nematocides and that it had an action favorable in accelerating the germination of seeds and growth of plants.

We also found that the accelerating action by means of 1-chloro-1,2-dibromoethane did not cause redundant growth to occur but was conducive to a well-balanced acceleration of the growth of the plants. It was also found that the quantity applied of the 1-chloro-1,2-dibromoethane, the effective ingredient of the invention, was with advantage, controllable over a very wide range according to such factors as the type of plant, the characteristics of the soil, etc.; and that this ingredient also had nematocidal effects.

It is also possible to apply 1-chloro-1,2-dibromoethane into the soil, on top of the soil, or to the plant or seed itself. Moreover, it is residually effective in bringing about favorable effects on the germination and growth of plants.

Accordingly, it is an object of this invention to provide a germination and growth regulator of plants.

Another object of the invention is to provide a germination and growth regulator of plants which may be applied to the plant itself or to the soil to provide an improved plant nutrient composition.

A further object of the invention is to provide a method of accelerating the germination and growth of plants by using such a regulator.

A still further object of the invention is to provide a germination and growth regulator and a method of using the same in which the germination and growth is accelerated in a well-balanced manner and soil fumigating effects that are effective in killing off nematoda are also possessed.

Other objects and advantages of the invention will become apparent from the following description.

1-chloro-1,2-dibromoethane, the effective ingredient of the plant germination and growth regulator according to this invention, is a compound having the following molecular formula

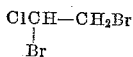

its specific gravity being 2.248 (19° C.) and vapor pressure, about 4.0 mm. Hg (25° C.). Although it can be used, as such, as a plant germination and growth regulator without any dilution at all, normally it is conveniently used in the form such as a suitable oil solution, emulsion, wettable-power suspension, powder, granular form, etc. after first diluting with a liquid diluent and/or solid diluents.

Included as such diluents, one or more of which may be used, are, for example, the organic solvents such as carbon tetrachloride, toluene, xylene, benzene, acetone, ligroine, naphtha, kerosene, the petroleum ethers, the lower aliphatic alcohols, etc., the liquid diluents such as water containing a surface-active agent, and/or solid diluents such as carbon, bentonite, diatomaceous earth, acid terra alba, vermiculite, silica, volcanic ashes, kaolin, sawdust, etc. Or, solvents having insecticidal effects may be used, such for example, as ethylene dibromide, ethylene dichloride, propylene oxide, isopropyl formate, hydrogen cyanide, trichlorobromomethane, acrylonitrile, carbon disulfide, trichloroethylene, tetrachloroethylene, allyl chloride, methyl bromide, chloropicrin, sulfur dioxide, 1,1'-dichloroethylene, etc. In diluting the 1-chloro-1,2-dibromoethane with the aforementioned diluents, the proportion of dilution can be varied depending on the method used. Normally, it is however conveniently used as a composition diluted so as to contain the 1-chloro-1,2-dibromoethane in a concentration of about 1–80% by weight, that of about 10–50% by weight being particularly preferred.

In using the germination and plant growth regulator of this invention, it may be applied to the area in which plants are already growing or to the area in which plants are to be grown. Alternatively, the seeds may be directly immersed in or sprayed with the chemical fluid, and the thus treated seeds be sown. It is, of course, possible to perform these operations either alone or in combination. Furthermore, in view of the unique nature of the effective ingredient of the present invention with respect to its germination and plant growth regulating action, it is not necessarily required that it be applied to the soil only.

According to the method of the invention, the 1-chloro-1,2-dibromoethane may be applied to either the area in which plants are growing or the area in which plants or seeds are to be grown, or to both, in an amount ranging about 0.3 to 4 liters to an acre.

The following examples are given in which are described in further detail the effects on the germination of seeds and the growth of plants when the 1-chloro-1,2-dibromoethane according to the invention is used.

EXAMPLE 1

Cabbage seeds (commercially available) were immersed for 3 hours in respectively an original solution of 1-chloro-1,2-dibromoethane and a solution thereof diluted to a concentration of 20% with Solpopal (a nonionic dispersing agent produced by Grossi of Tagliado Company of Italy) [the temperature in both cases being 25° C.] and then removed therefrom. After thorough washing, the seeds were placed in a dish, the bottom of which was completely covered with a moistened filter paper, with the seeds being placed on said filter paper uniformly spaced from each other. This dish was then placed in a thermostat maintained at 25 C. and the percentage of germination of the seeds at the end of the prescribed number of days was sought. As controls, the experiment was performed by immersing under identical conditions in water as usually practiced prior to seeding and also by treating under similar conditions with EDB and DBCP which have been known as nematocides and seeking their rates of germination to determine whether or not these had the same effects. The results thereof are shown in Table I below.

*Table I.—Rate of germination (percent)*

| Days | Control, Water | Control (Nematocide) | | Control (Nematocide) | | Effective Ingredient of the Present Invention | |
|---|---|---|---|---|---|---|---|
| | | DBCP, Original Liquid | DBCP, 20% | EDB, Original Liquid | EDB, 20% | 1-chloro-1, 2-dibromo-ethane, Original Liquid | 1-chloro-1, 2-dibromo-ethane, 20% |
| 2 | 10.0 | 13.3 | 0 | 20.0 | 20.0 | 3.3 | 23.3 |
| 3 | 33.3 | 23.3 | 3.3 | 46.7 | 43.3 | 23.3 | 53.3 |
| 4 | 33.3 | 36.7 | 3.3 | 56.7 | 43.3 | 46.7 | 53.3 |
| 8 | 56.7 | 43.3 | 23.3 | 53.3 | 56.3 | 70.0 | 66.7 |

As apparent from the results of Table I, above, while the rate of germination in case of EDB and DBCP was only of an extent equal to that of the control (water), in case of the seeds given the immersion treatment with the effective ingredient of the present invention, the rate of germination increased on the other hand. Hence, it can be seen that 1-chloro-1,2-dibromoethane differing essentially from these halogenated chain hydrocarbons which have been known heretofore as nematocides, possesses a unique germination accelerating effect with respect to plant seeds. Namely, taking the case in which after immersion for 3 hours the time elapsed was 8 days, for instance, in case of immersion in the original liquid, the rate of germination when DBCP and EDB were used were 43.3% and 53.3% respectively, whereas it was 70.0% when 1-chloro-1,2-dibromoethane was used. Thus it is seen that the effective ingredient according to the present invention possesses chemical effects conspicuously different from those substances known heretofore as nematocides in that it possesses a unique germination accelerating effect not possessed by the latter.

Furthermore, the 1-chloro-1,2-dibromoethane, the effective ingredient according to the invention, possesses a growth accelerating action with respect to plant life. As already described, the control of the accelerating action of a plant growth regulator is very difficult, it being impossible to avoid the tendency of it to bring about redundant growth of the plants. In many instances, the redundant growth action is made use of rather, and these plant growth regulators are utilized as herbicides. On the other hand, the effective ingredient of the present invention is characterized in that it possesses the action of accelerating the well-balanced growth of plant life without causing the occurrence of redundant growth. Namely, just as it differs completely in its chemical structure from that of the heretofore-known growth regulators, the effective ingredient of this invention differs also in its action. Moreover, its characteristics differ also definitely from those halogenated chain hydrocarbons having relatively similar structures. Although its biological mechanism has not been fully clarified as yet, it is thought that it also participates in the action of suitably regulating the activity of the nitrobacteria, which being present in the soil converts the nitrogen that is in a state available for plants to a form readily adsorbed thereby.

EXAMPLE 2

Japanese pumpkin seedlings were grown using the effective ingredient of the present invention and as controls that known as a nematocide, the mixture consisting of 1,3-dichloropropene and 1,2-dichloropropane (D-D) and that in which no such chemicals were contained were used. When the state of the growth of these seedlings were compared, at the end of three months they were as in Table II, below. These results were obtained by tests performed by growing in pots using as the test soil sandy loam and application of the chemicals at the rate of 1 ml. to each pot.

*Table II.—State of growth*

| | Taproot length (cm.) | Stem length (cm.) | Branches (ea.) | Stem length/ taproot length |
|---|---|---|---|---|
| Control | 21.3 | 17.3 | 4.7 | 0.81 |
| Control (D-D) | 23.5 | 34.7 | 5 | 1.4 |
| Present Invention (1-chloro-1,2-dibromoethane) | 33.8 | 26.5 | 5 | 0.78 |

As apparent from the results of Table II, above, the state of growth becomes better when chemicals are used, as compared with the instance when not used. However, in the case when D-D has been used, the proportional growth of the taproot to the stem above the earth becomes extremely unbalanced. Thus, in case of this D-D which is used as a nematocide, abnormal growth is shown in the stem only so that the phenomenon of redundant growth appears. When compared with the natural growth control, its stem length/taproot ratio shows an unbalanced value of 1.4. On the other hand, when the effective ingredient of the present invention is used, a value of 0.78 is shown, which is practically equal to 0.81, the value shown by the natural growth control. Thus, it can be seen that the state of growth is normal in this instance. Moreover, it manifested a growth accelerating action that was about 1.5 times that of the natural growth control in both the taproot length and stem length. On the other hand, in the control in which D-D was used, there was observed substantially no accelerating effect in the growth of the taproot length. Instead, what was observed was only its action as a nematocide as heretofore known.

We believe that the most distinguishing point as regards the effect that the effective ingredient according to the present invention has on the growth of plant life is the fact that it possesses accelerating action that causes well-balanced growth to occur in the plants without derangement of the balance of the natural growth of plant life of the manifestation of the phenomenon of redundant growth to occur. This fact, together with the fact that 1-chloro-1,2-dibromoethane which heretofore had not even been used so much as nematocide has the effect of accelerating both the germination of seeds and the growth of plants, is a very distinguishing action.

The plant germination and growth regulator of the present invention, which is without the drawbacks of the conventional plant growth regulators that were apt to cause abnormal growth to occur or manifest in some instances actions as would even damage the plants, possesses germination and growth accelerating effects which results in the growth to take place in suitable amounts and in a well-balanced manner. Therefore, the plant germination and growth regulator according to the present invention is very valuable since it also has nematocidal actions.

While the invention has been described by means of specific examples, as given hereinbefore, these have been intended to be merely illustrative, and the invention is not to be limited thereby.

Having thus set forth the nature of the invention, what we claim is:

1. A method for improving the germination and growth characteristics of plant seed which comprises applying to the surface of said plant seed 1-chloro-1,2-dibromoethane in an amount effective to accelerate the rate of germination of said seed.

2. The method according to claim 1 wherein said application of said 1-chloro-1,2-dibromoethane is carried out preliminary to planting said seed in soil.

3. The method according to claim 1 wherein said application of said 1-chloro-1,2-dibromoethane is carried out after said seed is planted in soil by an application of said 1-chloro-1,2-dibromoethane to the resulting seed-containing soil.

4. The method according to claim 1 wherein said 1-chloro-1,2-dibromoethane is applied to said seed in the form of a composition comprising said 1-chloro-1,2-dibromothane and an inert diluent carrier therefor.

5. The method according to claim 4 wherein the amount of said 1-chloro-1,2-dibromoethane present in said composition applied to said seed is in the range of from about 1 to about 80% by weight of said inert diluent carrier.

6. A method for improving the plant growth characteristics of soil which comprises treating said soil with an amount of 1-chloro-1,2-dibromoethane effective to accelerate the growth rate of plants in said soil.

7. The method according to claim 6 wherein said treatment of said soil is carried out preliminary to the planting of plants in said soil and subsequent to said treatment plants are planted in the resulting treated soil.

8. The method according to claim 6 wherein said treatment of said soil is carried out subsequent to a planting of plants in said soil.

9. The method according to claim 6 wherein said treatment of said soil is carried out with said 1-chloro-1,2-dibromoethane being in the form of a composition comprising said 1-chloro-1,2-dibromoethane and an inert diluent carrier therefor.

10. The method according to claim 9 wherein the amount of said 1-chloro-1,2-dibromoethane present in said composition employed in treating said soil is in the range of from about 1 to about 80% by weight of said inert diluent carrier.

11. The method according to claim 6 wherein the amount of said 1-chloro-1,2-dibromoethane employed in said treatment of said soil is in the range of from about 0.3 to about 4 liters per acre of said soil.

References Cited by the Examiner

UNITED STATES PATENTS

| | | | |
|---|---|---|---|
| 2,448,265 | 8/48 | Kagy et al. | 167—22 |
| 2,937,936 | 5/60 | Schmidt | 71—2.7 |
| 3,049,472 | 8/62 | Swezey | 71—2.7 |

OTHER REFERENCES

Kirrmann: Chemical Abstracts, volume 33, column 9139(3), 1939.

Schmitz et al.: Chemical Abstracts, volume 37, column 5910(3), 1943.

LEWIS GOTTS, *Primary Examiner.*